United States Patent [19]

Alexander

[11] Patent Number: 4,657,448
[45] Date of Patent: Apr. 14, 1987

[54] PANTOGRAPH ANGULAR BITTED KEY CUTTING MACHINE

[76] Inventor: Arthur Alexander, 60 Reade St., New York, N.Y. 10007

[21] Appl. No.: 728,695

[22] Filed: Apr. 29, 1985

[51] Int. Cl.⁴ .............................................. B23C 3/35
[52] U.S. Cl. ..................................... 409/81; 76/110
[58] Field of Search .............. 409/81, 82, 83; 76/110; 51/157

[56] References Cited

U.S. PATENT DOCUMENTS

| | | | |
|---|---|---|---|
| 3,457,831 | 7/1969 | Adler et al. | 409/81 |
| 3,457,832 | 7/1969 | Adler et al. | 409/81 |
| 3,625,111 | 12/1971 | Carlo et al. | 409/83 |
| 3,807,276 | 4/1974 | Oliver | 409/81 |
| 4,051,748 | 10/1977 | Sherman | 76/110 |
| 4,132,151 | 1/1979 | Weber | 409/82 |

FOREIGN PATENT DOCUMENTS

| | | | |
|---|---|---|---|
| 2462467 | 7/1977 | Fed. Rep. of Germany | 409/81 |
| 2448404 | 10/1980 | France | 409/81 |

Primary Examiner—William R. Briggs
Attorney, Agent, or Firm—Richard L. Miller

[57] ABSTRACT

A pantograph angular bitted key cutting machine is provided which facilitates the replication of angular bitted keys, commonly known as MEDECO ® keys by automatically replicating the position, depth and angularity of each tooth. Accurate angularity, the most difficult of the variables to replicate, is assured by ensuring that the center of rotation of the angular tooth wall is perpendicular to the radius of the cutting head. Two major embodiments are provided. In the first, the cutting head and the guide which aligns with the original key are fixed in the same line. In the second embodiment the guide and the original key are placed directly behind the cutting head and the blank duplicate key.

6 Claims, 15 Drawing Figures

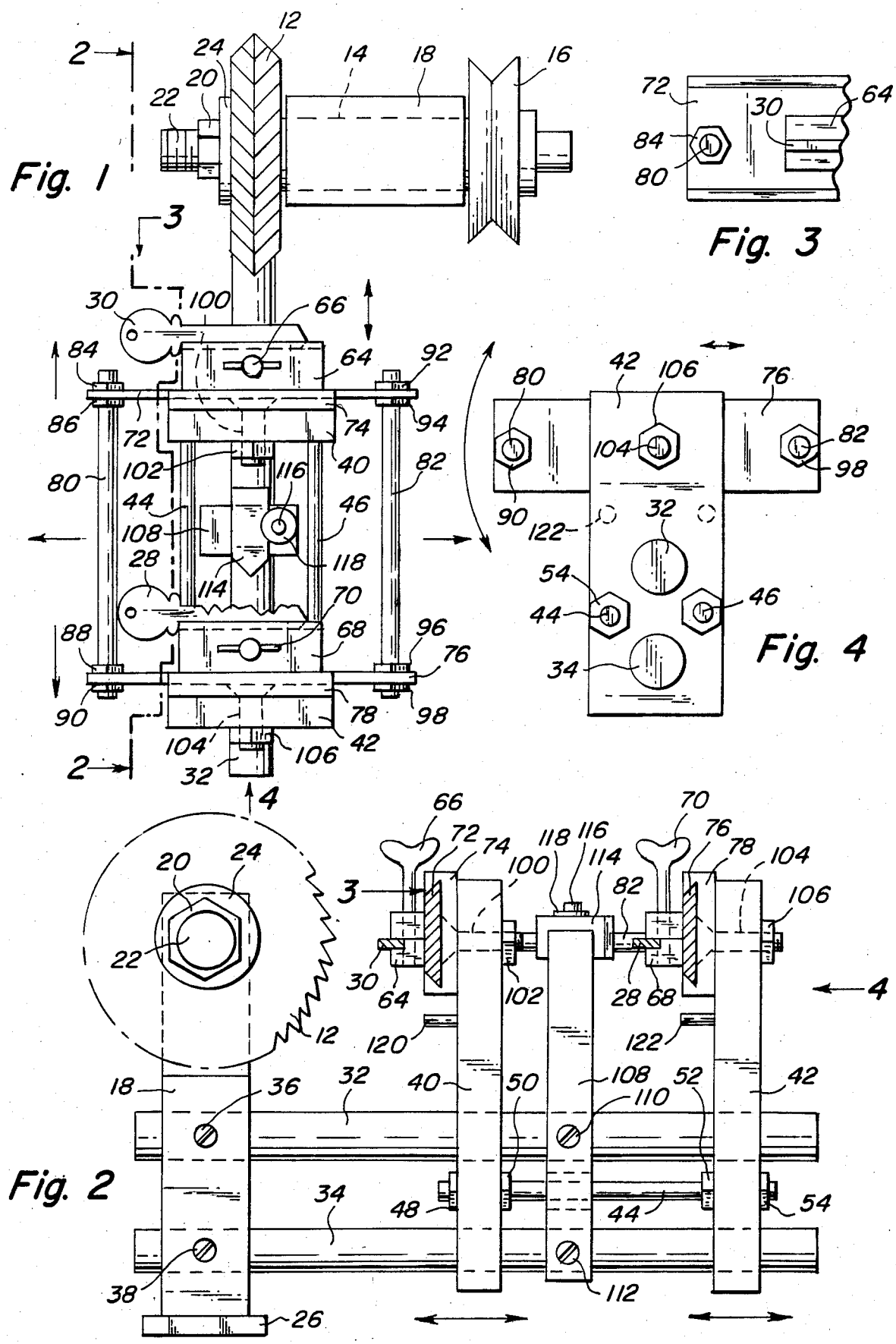

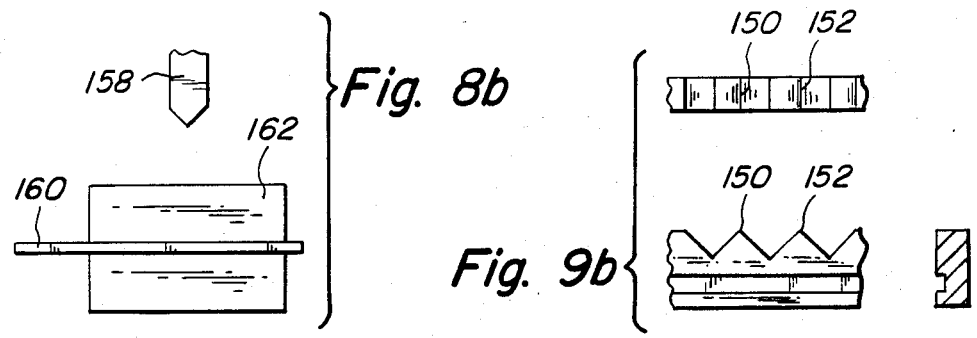
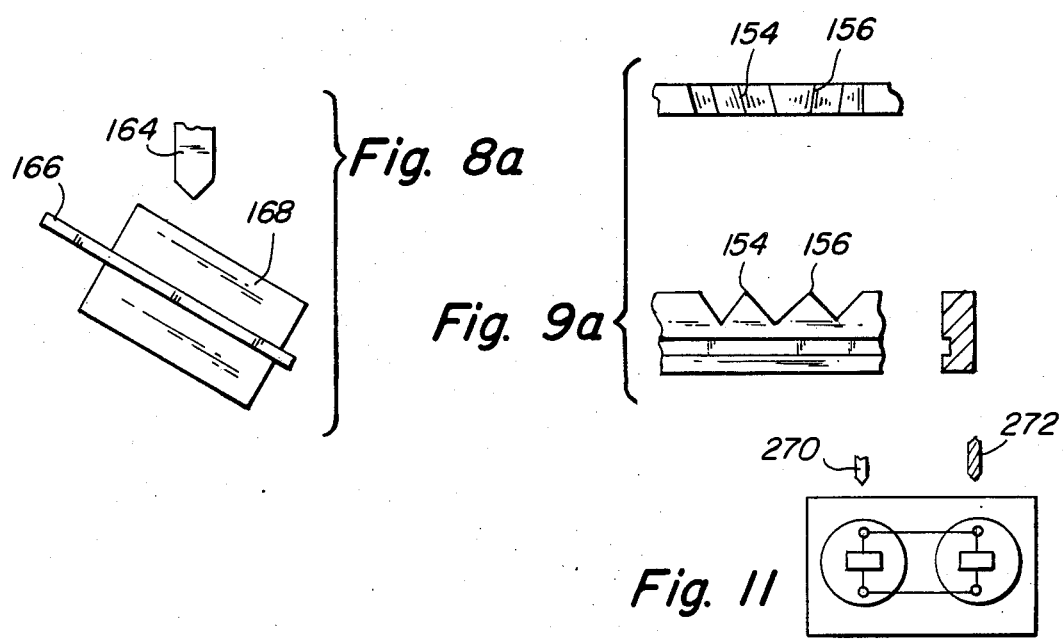
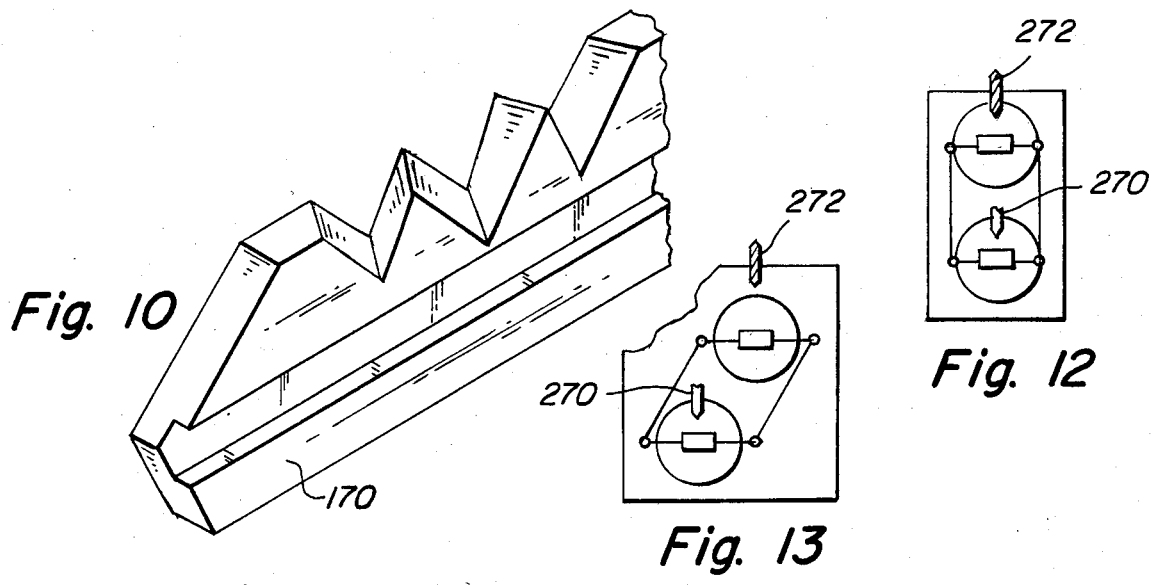

PANTOGRAPH ANGULAR BITTED KEY CUTTING MACHINE

BACKGROUND OF THE INVENTION

The present invention relates generally to the field of key cutting machines and, more specifically, to machines which cut teeth with non-orthogonal walls.

In the search for locks with greater security a number of improvements have been made to existing designs. Most existing security locks have pins and tumblers which are actuated by teeth which vary according to their depth and position. Recent locks, particularly those made popular by the MEDECO ® Company, employ a third variable in that the teeth have angulated walls instead of the ninety-degree walls common to other locks.

These oblique walls create difficulty when angular bitted keys are duplicated. Current techniques require that the position, depth and angle of each tooth be measured, tabulated and then carefully reproduced. This process is both time-consuming and costly.

A number of solutions have been suggested to the problem of duplicating angular bitted keys. R. Oliver (U.S. Pat. No. 3,807,276) developed a lock key reproducing tool; however the locus of the key to be cut is not in the same plane as the cutter. N. Adler, et. al. (U.S. Pat. No. 3,457,831) provides a plunge activated cutter having angularly directed bits which has the disadvantage of requiring the withdrawal of a pin to set each cut. C. Sherman (U.S. Pat. No. 4,051,748) provides a key cutting machine for producing obliquely oriented bitting in which the pivot axis do not remain centered on the center of the cutter and the guide. Finally, N. Adler. et. al. (U.S. Pat. No. 3,457,832) provide a key cutter device in which the support posts prevent necessary rotation of the original key and the blank duplicate. For precision duplication of angular bitted keys the center of rotation of the angular tooth wall must be perpendicular to the radius of the cutting head at all times.

SUMMARY OF THE INVENTION

It is, therefore, a primary object of the instant invention to provide a pantograph angular bitted key cutting machine can easily and, therefore, economically replicate keys in which the walls of the teeth oblique and not orthogonal to the length of the key.

A further object is to provide a pantograph angular bitted key cutting machine in which the radius of the cutting head is always perpendicular to the center of rotation of the angular wall of each tooth at all times.

Another further object is to provide a pantograph angular bitted key cutting machine which does not require the insertion of any alignment pins.

Another further object is to provide a pantograph angular bitted key cutting machine which is simple in construction and inexpensive to fabricate and uses the minimum number of components.

A still further object is to provide a pantograph angular bitted key cutting machine which may be added to an existing key-duplicating machine using the existing cutting head.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a top view of the pantograph key cutting arrangement.

FIG. 2 is a cross sectional view taken generally along cut 2—2 in FIG. 1 and turned 90 degrees.

FIG. 3 is a partial rear view of the slide plate as indicated by arrow 3 in FIGS. 1 and 2.

FIG. 4 is a front view with some details omitted for clarity as indicated by arrow 4 in FIGS. 1 and 2.

FIG. 8a is a diagrammatic view showing an angular bitted key about to be cut.

FIG. 8b is a diagrammatic view showing a conventional key about to be cut. FIG. 9a illustrates some typical angular bitted key cuts.

FIG. 9b similarly illustrates some conventional key cuts.

FIG. 10 is a perspective view of a typical angular bitted key.

Figure 5:
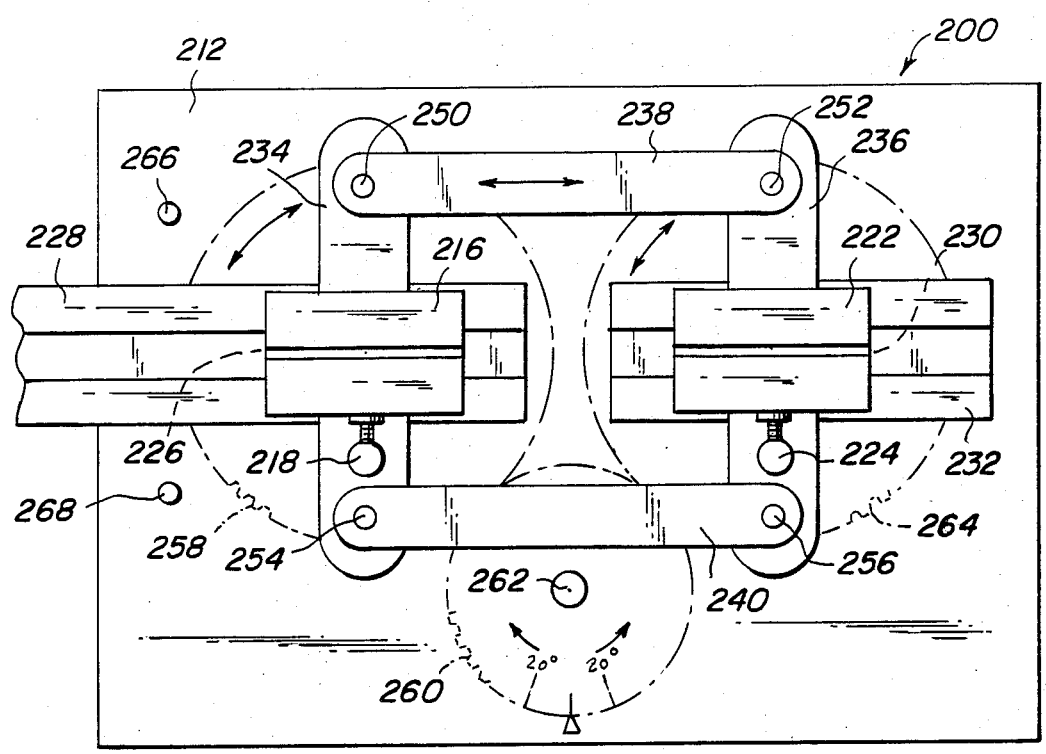
FIG. 5 is a top view of a second embodiment of the invention.

FIG. 11 is a diagrammatic plan view of the pantograph key cutting arrangement similar to that illustrated in detail in FIG. 5.

FIG. 12 is a diagrammatic plan view of the pantograph key cutting arrangement illustrating an embodiment with the cutting head behind the follower components.

FIG. 13 is a diagrammatic plan view of the pantograph key cutting arrangement illustrating an embodiment with the cutting head behind and off to the right of the follower components.

DETAILED DESCRIPTION OF THE PREFERRED EMBODIMENTS

The difficulty of cutting angular bitted teeth is best understood with reference to FIGS. 8 to 10. In FIG. 9b conventional teeth may be seen to be orthogonal at 150 and 152. However, angular bitted teeth 154 and 156 in FIG. 9a are seen to be oblique. The orthogonal teeth in FIG. 9b may be made by the orthogonally placed cutting head 158 in FIG. 8b as it approaches blank duplicate key 160 which is held in position by duplicate key vice 162. However, the oblique teeth in FIG. 9a may be made by the obliquely placed cutting head 164 in FIG. 8a as it approaches blank duplicate key 166 which is held in position by duplicate key vice 168. The perspective view of an angular bitted key 170 clarifies this still further.

One embodiment of a system which replicates angular bitted keys may be seen in FIGS. 1 to 4. The actual cutting of duplicate keys is made by the cutting teeth on cutting head 12 which rotates on shaft 14 which is powered by an unseen belt around pulley 16. Shaft 14 rotates inside a bushing in shaft support 18. Shaft support 18 rests on base 26 and therefore support the entire invention. Cutting head 12 is attached to shaft 14 by threading nut 20 onto threaded shaft section 22. Accessory washer 24 is used.

It is noted that original key 28 has angular bitted teeth and that blank duplicate key 30 is to be cut so that its angular teeth are a precise match.

Upper guide rail 32 and lower guide rail 34 project through apertures in shaft support 18 and are permanently fixed in position by attachment screws 36 and 38. The guide rails are shown to have circular cross section, but is is understood that any appropriate cross section could be used.

Upper guide rail 32 and lower guide rail 34 project through holes in duplicate key support 40 permitting duplicate key support 40 to slide from left to right in FIG. 2. In a similar manner, original key support 42 may slide along the guide rails. The spacing between duplicate key support 40 and original key support 42 is maintained by link pins 44 and 46 together with associated nuts 48, 50, 52, and 54 on link pin 44 and corresponding nuts on link pin 46.

Blank duplicate key 30 is held in position in duplicate key vice 64 by tightening wing screw 66. Similarly, original key 28 is held in position in original key vice 68 by tightening wing screw 70. Duplicate key vice 64 is permanently attached to duplicate key slide plate 72 which moves laterally inside duplicate key slide bracket 74. Similarly, original key vice 68 is permanently attached to original key slide plate 76 which moves laterally inside original key slide bracket 78. Lateral movements of blank duplicate key 30 and original key 28 are held equal by threaded shafts 80 and 82, which are held in place by nuts 84, 86, 88, 90, 92, 94, 96, and 98.

Duplicate key slide bracket 74 is pivoted at its center by duplicate key pivot 100 and associated nut 102. Similarly, original key slide bracket 78 is pivoted at its center by original key pivot 104 and associated nut 106. Rotation of the slide brackets 74 and 78 and their respective slide plates 72 and 74 is limited by limit stops typified by 120 and 122. It is important to note that this system provides the proper angularization.

A fixed reference is provided by fixed vertical support 108 which is permanently fixed to upper guide rod 32 and lower guide rod 34 by attaching screws 110 and 112. Wedge-shaped guide 114 is positioned and then secured in place by guide adjustment screw 116 and washer 118.

In operation, blank duplicate key 30 is locked into duplicate key vice 64 and original key 28 is locked into original key vice 68. By carefully positioning the wedge-shaped guide 114 snugly against an angular bitted tooth of original key 28 the notch made in blank duplicate key 30 will match the original key 28 in position, depth and angularity. Each tooth is notched in a similar manner until the entire key is replicated.

Figure 6:
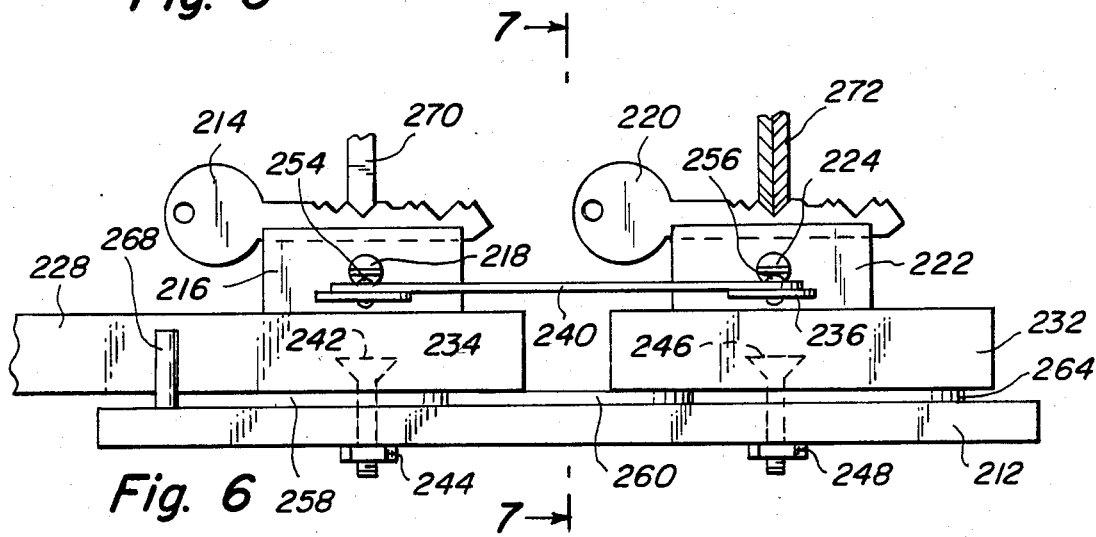
FIG. 6 is a front view thereof.
Figure 7:
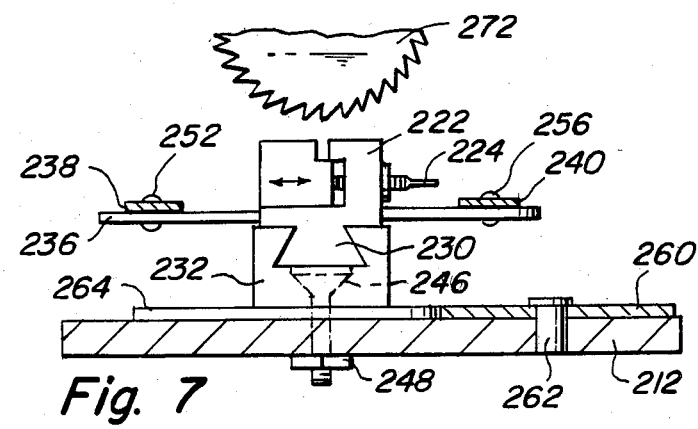
FIG. 7 is a cross-sectional view taken on line 7—7 of FIG. 5.

A second embodiment of the invention may best be understood with reference to FIGS. 5 to 7. The invention 200 is built upon a base plate 212 which is fixed laterally. Original key 214 is mounted into original key vice 216 by tightening original key wing screw 218. Similarly, blank duplicate key 220 is mounted into duplicate key vice 222 by tightening wing screw 224.

Original key vice 216 is attached to original key slide plate 226 which slides laterally inside original key slide bracket 228. Similarly, duplicate key vice 222 is attached to duplicate key slide plate 230 which slides laterally inside duplicate key slide bracket 232. Original key cantilever arm 234 is fixed at right angles to original key vice 216 while duplicate key cantilever arm 236 is fixed at right angles to duplicate key vice 222. Pivot bars 238 and 240 connect the cantilever arms and cause them to have equal lateral displacement.

Original key pivot 242 and accessory nut 244 permit original key slide bracket 228 to rotate while duplicate key pivot 246 and accessory nut 248 permit duplicate key slide bracket 232 to rotate. Their angular rotations are held equal by pivot arms 238 and 248 which are free to pivot due to pivots 250, 252, 254, and 256. If a greater degree of accuracy is needed, optional gears may be provided. For example, original key gear 258 meshes with intermediate gear 260, which pivots on 262 to drive original key gear 264.

Limit stops 266 and 268 limit the rotation of the key vices 216 and 222.

Wedge-shaped guide 270 is brought into intimate contact with original key 214 which is rotated as required. Cutting head 272 will then cut a notch into blank duplicate key 220 of the proper position, depth and angularity.

Slightly different embodiments may best be understood with reference to FIGS. 11, 12 and 13. The embodiment of FIG. 5, already described, is represented diagrammatically in FIG. 11. Note that cutting head 272 is located to the right of wedge-shaped guide 270. In FIG. 12 cutting head 272 is located directly behind guide 270. Finally, in FIG. 13 cutting head 272 is located behind and to the right of wedge-shaped guide 270. These alternative embodiments provide for ergonomic preferences.

It is to be emphasized that the original key and key to be duplicated always travel on a path which is through the center of rotation of the respective cutting head and guide regardless of the angle being cut in the key.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. a pantograph angular bitted key cutting machine, comprising in combination:
    (a) a rotating cutting head capable of notching teeth into a blank duplicate key;
    (b) a duplicate key vice which locks said blank duplicate key into said cutting machine;
    (c) an original key whose tooth pattern is to be duplicated by notching the teeth of said blank duplicate key;
    (d) an original key vice which locks said original key into said cutting machine;
    (e) means for coupling said duplicate key vice and said original key vice such that any advancing or receding displacement of either of said keys, which controls the depth of said notching, produces precisely the same advancing or receding displacement of the other of the said keys;
    (f) means for coupling said duplicate key vice and said original key vice such that any lateral displacement of either of said keys, which controls the lateral position of said notching, produces precisely the same lateral displacement of the other of the said keys;
    (g) means for coupling said duplicate key vice and said original key vice such that any rotational displacement of either of said keys, which controls the angularization of said notching, produces precisely the same rotational displacement of the other of said keys; and, (h) means for aligning the lateral position of both of said keys and the rotational position of both of said keys such that the depth, spacing and angularization of notches made to said blank duplicate key precisely match the depth, spacing and angularization of pre-existing notches in said original key when said blank duplicate key is notched by said cutting head, wherein said means for coupling said duplicate key vice and said original key vice such that anly lateral displacement of either of said keys, which controls the lateral position of said notching, produces precisely the same lateral displacement of the other of the said keys comprises an original key slide plate to which said origianl key vice is fixedly mounted and an accessory original key slide bracket inside of which said original key slide plate slides laterally; a duplicate key slide plate to which said duplicate key vice is fixedly mounted and an accessory duplicate key slide bracket inside of which said duplicate key slide plate slides laterally; a cantilever arm which is permanently attached to said original key slide plate and extends perpendiculary thereto; a similar cantilever arm which is permanently attached to said duplicaste key slide plate and extends perpendicularly thereto; and, at least one pivot bar which connects said cantilever arms such that both said duplicate key vice and said original key vice maintain equal lateral displacement.

2. A pantograph angular bitted key cutting machine, comprising in combination:

(a) a rotating cutting head capable of notching teeth into a blank duplicate key;

(b) a duplicate key vice which locks said blank duplicate key into said cutting machine;

(c) an original key whose tooth pattern is to be duplicated by notching the teeth of said blank duplicate key;

(d) an original key vice which locks said original key into said cutting machine;

(e) means for coupling said duplicate key vice and said original key vice such that any advancing or receding displacement of either of said keys, which controls the depth of said notching, produces precisely the same advancing or receding displacement of the other of the said keys;

(f) means for coupling said duplicate key vice and said original key vice such that any lateral displacement of either of said keys, which controls the lateral position of said notching, produces precisely the same lateral displacement of the other of the said keys;

(g) means for coupling said duplicate key vice and said original key vice such that any rotational displacement of either of said keys, which controls the angularization of said notching, produces precisely the same rotational displacement of the other of the said keys; and, (h) means for aligning the lateral position of both of said keys and the rotational position of both of said keys such that the depth, spacing and angularization of notches made to said blank duplicate key precisely match the depth, spacing and angularization of pre-existing notches in said original key when said blank duplicate key is notched by said cutting head, wherein said means for coupling said duplicate key vice and said orignal key vice such that any advancing or receding displacement of either of said keys, which controls the depth of said notching, produces precisely the same advancing or receding displacement of the other of the said key comprises a shaft support mounted to a machine base; wherein said shaft support encircles a shaft upon which is made to rotate a cutting head; a lower guide rail and an upper guide rail which project laterally away from said shaft support and are permanently fixed to said shaft support; a duplicate key vertical support with apertures through which pass both of said guide rails such that said duplicate key vertical support may move slideably along said guide rails and thereby cause said duplicate key vice and said blank duplicate key to advance or recede; an original key vertical support with apertures through which pass both of said guide rails such that said original key vertical support may move slideably along said guide rails and thereby cause said original key vice and said original key to advance and recede; one or more link pins which connect said duplicate key vertical support to said original key vertical support such that both of said keys advance or recede together.

3. A pantograph angular bitted key cutting machine, comprising in combination:

(a) a rotating cutting head capable of notching teeth into a blank duplicate key;

(b) a duplicate key vice which locks said blank duplicate key into said cutting machine;

(c) an original key whose tooth pattern is to be duplicated by notching the teeth of said blank duplicate key;

(d) an original key vice which locks said original key into said cutting machine;

(e) means for coupling said duplicate key vice and said original key vice such that any advancing or receding displacement of either of said keys, which controls the depth of said notching, produces precisely the same advancing or receding displacement of the other of the said keys;

(f) means for coupling said duplicate key vice and said original key vice such that any lateral displacement of either of said keys, which controls the lateral position of said notching, produces precisely the same lateral displacement of the other of the said keys;

(g) means for coupling said duplicate key vice and said original key vice such that any rotational displacement of either of said keys, which controls the angularization of said notching, produces precisely the same rotational displacement of the other of the said keys; and, (h) means for aligning the lateral position of both of said keys and the rotational position of both of said keys such that the depth, spacing and angularization of notches made to said blank duplicate key precisely match the depth, spacing and angularization of pre-existing notches in said original key when said blank duplicate key is notched by said cutting head, wherein said means for coupling said duplicate key vice and said original key vice such that any lateral displacement of either of said keys, which controls the lateral position of said notching, produces precisely the same lateral displacement of the other of the said keys comprises a duplicate key vice permanently attached to a duplicate key slide plate which slides laterally inside a duplicate key slide bracket which is attached to a duplicate key vertical support; an original key vice permanently attached to an original key slide plate which slides laterally inside an original key slide bracket which is attached to a original key vertical support; and, two threaded shafts each of which pass through corresponding apertures in said duplicate key slide plate and said original key slide plate such that the lateral displacement of each of said slide plates is precisely equal.

4. A pantograph angular bitted key cutting machine, comprising in combination:
 (a) a rotating cutting head capable of notching teeth into a blank duplicate key;
 (b) a duplicate key vice which locks said blank duplicate key into said cutting machine;
 (c) an original key whose tooth pattern is to be duplicated by notching the teeth of said blank duplicate key;
 (d) an original key vice which locks said original key into said cutting machine;
 (e) means for coupling said duplicate key vice and said original key vice such that any advancing or receding displacement of either of said keys, which controls the depth of said notching, produces precisely the same advancing or receding displacement of the other of the said keys;
 (f) means for coupling said duplicate key vice and said original key vice such that any lateral displacement of either of said keys, which controls the lateral position of said notching, produces precisely the same lateral displacement of the other of the said keys;
 (g) means for coupling said duplicate key vice and said original key vice such that any rotational displacement of either of said keys, which controls the angularization of said notching, produces precisely the same rotational displacement of the other of the said keys; and,
 (h) means for aligning the lateral position of both of said keys and the rotational position of both of said keys such that the depth, spacing and angularization of notches made to said blank duplicate key precisely match the depth, spacing and angularization of pre-existing notches in said original key when said blank duplicate key is notched by said cutting head, wherein said means for coupling said duplicate key vice and said original key vice such that any rotational displacement of either of said keys, which controls the angularization of said notching, produces precisely the same rotational displacement of the other of the said keys comprise a duplicate key pivot, which permits said duplicate key vice to rotate under said cutting head; and original key pivot which permits said original key vice to rotate under said guide; and pivots at the points of attachment between a cantilever arms and said pivot bars such that the angular rotation of both of said vices is equal, further comprising an original key gear mounted on the axis of rotation of said original key vice; a duplicate key gear mounted on the axis of rotation of said duplicate key vice; and, an intermediate gear between both of said other gears, such that the angle of rotation of both of said vices may be readily adjusted with a high degree of accuracy.

5. A pantograph angular bitted key cutting machine, comprising in combination:
 (a) a rotating cutting head capable of notching teeth into a blank duplicate key;
 (b) a duplicate key vice which locks said blank duplicate key into said cutting machine;
 (c) an original key whose tooth pattern is to be duplicated by notching the teeth of said blank duplicate key;
 (d) an original key vice which locks said original key into said cutting machine;
 (e) means for coupling said duplicate key vice and said original key vice such that any advancing or receding displacement of either of said keys, which controls the depth of said notching, produces precisely the same advancing or receding displacement of the other of the said keys;
 (f) means for coupling said duplicate key vice and said original key vice such that any lateral displacement of either of said keys, which controls the lateral position of said notching, produces precisely the same lateral displacement of the other of the said keys;
 (g) means for coupling said duplicate key vice and said original key vice such that any rotational displacement of either of said keys, which controls the angularization of said notching, produces precisely the same rotational displacement of the other of the said keys; and,
 (h) means for aligning the lateral position of both of said keys and the rotational position of both of said keys such that the depth, spacing and angularization of notches made to said blank duplicate key precisely match the depth, spacing and angularization of pre-existing notches in said orignal key when said blank duplicate key is notched by said cutting head, wherein said means for coupling said duplicate key vice and said original key vice such that any rotational displacement of either of said keys, which controls the angularization of said notching, produces precisely the same rotational displacement of the other of the said keys comprise a duplicate key pivot, which permits said duplicate key vice to rotate under said cutting head; and original key pivot which permits said orignal key vice to rotate under said guide; and pivots at the points of attachment between a cantilever arms and said pivot bars such that the angular rotation of both of said vices is equal, further comprising two limit stops which project upwards from a base plate upon which the invention is constructed such that the rotation of said cantilever arms is thereby limited.

6. A pantograph angular bitted key cutting machine, comprising in combination:
 (a) a rotating cutting head capable of notching teeth into a blank duplicate key;
 (b) a duplicate key vice which locks said blank duplicate key into said cutting machine;
 (c) an orignal key whose tooth pattern is to be duplicated by notching the teeth of said blank duplicate key;
 (d) an original key vice which locks said original key into said cutting machine;
 (e) means for coupling said duplicate key vice and said original key vice such that any advancing or receding displacement of either of said keys, which controls the depth of said notching, produces precisely the same advancing or receding displacement of the other of the said keys;

(f) means for coupling said duplicate key vice and said original key vice such that any lateral displacement of either of said keys, which controls the lateral position of said notching, produces precisely the same lateral displacement of the other of the said keys;

(g) means for coupling said duplicate key vice and said original key vice such that any rotational displacement of either of said keys, which controls the angularization of said notching, produces precisely the same rotational displacement of the other of the said keys; and, (h) means for aligning the lateral position of both of said keys and the rotational position of both of said keys such that the depth, spacing and angularization of notches made to said blank duplicate key precisely match the depth, spacing and angularization of pre-existing notches in said original key when said blank duplicate key is notched by said cutting head, wherein said means for aligning the lateral position of both of said keys and the rotational position of both of said keys such that the depth, spacing and angularization of notches made to said blank duplicate key precisely match the depth, spacing and angularization of pre-existing notches in said original key when said blank duplicate key is notched by said cutting head comprises a fixed vertical support with apertures through which both said upper guide rail and said lower guide rail project wherein said fixed vertical support is permanently attached to said guide rails at a position between said duplicate key vertical support and said original key vertical support and through which slideably pass a link pins; and a wedge shaped guide, adjusted in position by a guide adjustment screw; wherein said guide engages said pre-existing teeth in said original key such that a reference is provided for the lateral position, depth, and angularization, of the teeth which are to be duplicated, further comprising a pair of limit stops projecting from said duplicate key vertical support such that the angle of rotation of said duplicate key slide plate is restricted to some desired angle; and a pair of limit stops projecting from said original key vertical support such that the angle of rotation of said original key slide plate is restricted to said same desired angle.

* * * * *